J. P. SCHMIT.
MOTOR VEHICLE DRIVING MECHANISM.
APPLICATION FILED SEPT. 9, 1913.

1,129,021.                                  Patented Feb. 16, 1915.

Witnesses                                   Inventor
                                            John P. Schmit,
                                    By
                                                his Attorney

UNITED STATES PATENT OFFICE.

JOHN P. SCHMIT, OF LEWISTOWN, MONTANA.

MOTOR-VEHICLE DRIVING MECHANISM.

1,129,021.  Specification of Letters Patent.  Patented Feb. 16, 1915.

Application filed September 9, 1913. Serial No. 788,904.

*To all whom it may concern:*

Be it known that I, JOHN P. SCHMIT, a citizen of the United States, residing at Lewistown, in the county of Fergus and State of Montana, have invented certain new and useful Improvements in Motor-Vehicle Driving Mechanism, of which the following is a specification.

This invention relates to improvement in means for mounting the front wheels of motor vehicles in a relation that driving power may be transmitted thereto and also provide means by which the desired driving motion is accomplished as each of the front wheels is connected to act as a tractor.

An object of the invention is to provide an improved knuckle construction for the steering wheels whereby a drive will be axially imparted to these wheels thereby eliminating the provision of gears and other driving means carried by the wheels.

A further novel feature consists in providing a simple form of drive transmission from the front axle to the axle stud wherein the strains to which the knuckles are usually subjected will be wholly imposed thereon leaving the knuckle drive free of any binding stresses.

A further object is to provide an improved form of knuckle joint whereby the stud axle knuckle units may be incased so that the inclosed driving elements can run in oil.

Other features of novelty and construction will be more fully described in connection with the accompanying drawings, and will be more particularly pointed out and ascertained in and by the appended claims.

Figure 1:
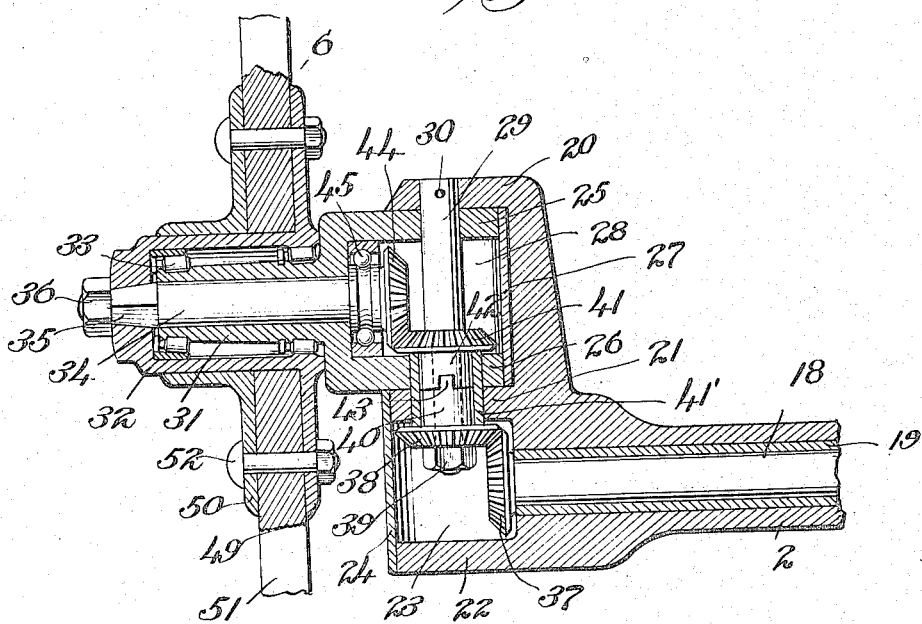
Figure 2:
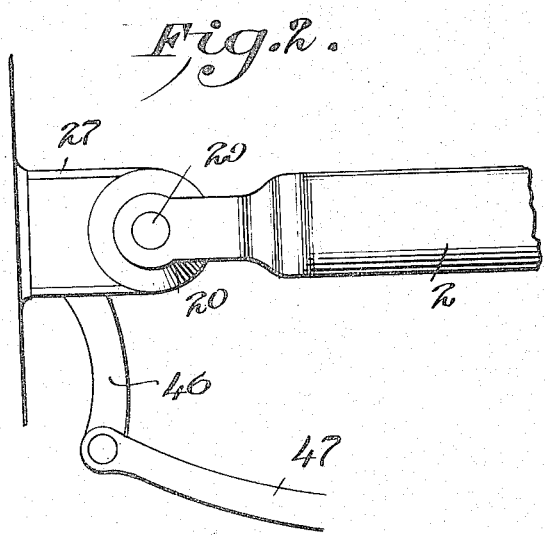

In the drawings:—Figure 1 is a longitudinal vertical sectional view to illustrate the structure of my invention. Fig. 2 is a fragmentary top plan to better illustrate the mounting and connection of the steering mechanism in its disposition with respect to the structure of the invention.

A front axle 2 is provided to be mounted in any desired manner upon the vehicle and as the mounting and the specific construction of this axle 2 do not form an essential part of the present invention, such structure is not included in the illustration in the drawing and in the description contained therein.

A front or steering wheel drive shaft 18 is carried by the front axle 2 and is preferably axially disposed therein and sleeved in a bushing 19. The front axle 2 is provided with upper intermediate and lower fork extensions 20, 21 and 22, there being a chamber 23 between the intermediate and lower forks 21 and 22 formed by a casing wall 24 which extends inwardly and which may be secured in a manner to prevent egress of oil carried therein. The front axle is hung on the wheel knuckle which is provided with a fork comprising forked arms 25 and 26, disposed between the upper and intermediate forks 20 and 21. A casing 27 incloses the forked end of the wheel knuckle so as to provide an oil chamber 28 therein.

A knuckle shaft 29 extends downwardly through fork-ends 20, 25, 26 and 21 to pivot the wheel knuckle to the shaft knuckle, and in the present construction, the knuckle shaft functions as a pivot shaft and is fixed to the fork 20 by a pin 30 or other suitable means so as to be immovable rotatively and longitudinally. The wheel knuckle terminates in a stud axle sleeve 31 on which the hub 32 of the steering wheel is rotatively mounted. Suitable anti-friction means such as rollers 33 may be provided to perform their usual function. The wheel hub 32 is non-rotatively connected with a stud axle 34 by engaging a polygonal portion 35 of said axle and the hub is retained thereon by a nut 36.

I will now describe the drive transmission from shaft 18 to stud axle 34.

In the present construction, I provide a gear drive and on the shaft 18 a bevel gear 37 is fixed. Gear 37 meshes with a bevel gear 38 which is rotatable on knuckle shaft 29 and which is supported thereon by means such as a nut 39. The bevel wheel 38 is provided with a clutch hub 40 which is freely rotatable in a bushing 41' disposed in the fork-ends 21 and 26. Wheel 38 drives a bevel wheel 41 which is provided with a clutch hub 42 journaled in bushing 41'. Hubs 40 and 42 are interlocked as indicated at 43 so as to be non-rotatably connected with each other during their rotation on shaft 29. Drive is imparted from bevel wheel 41 to bevel wheel 44 which is fixed to the stud axle 34. A suitable anti-friction bearing 45 may be provided for the inner end of axle 34.

It will be seen that each set of gears operates in an independent oil chamber and that the oil chamber 28 is capable of rotation with the axle sleeve fork on shaft 29. This arrangement not only serves to inclose the parts, so as to provide a smooth and attractive exterior appearance, but it greatly simplifies the construction in transmitting drive from the axle shaft 18 to the stud axle 34.

Knuckle steering arms 46 are connected with each other by a steering bar 47, which may be operated in any desirable manner.

The wheel hub construction shown comprises the hub sleeve 32 provided with a spoke flange 49 between which and a removable flange 50 the spokes 51 are secured by bolts 52.

It will thus be seen from Fig. 1, that I have provided a knuckle construction in which the front axle has a chambered end 23 together with a fork disposed thereabove, the steering wheel supporting stud member having a chambered end connected with the fork of the axle by a knuckle or pivot shaft. One set of gearing is disposed in the chambered end of the wheel member, while the other set of gearing is disposed in the chambered end of the axle member, thus one set of gearing is separate from the other and one of the gears of one set is connected with one of the gears of the other set. By the provision of this double fork construction on the axle end, I am enabled to provide a knuckle construction of the most compact and efficient form which provides for all of the advantages of steering with the front wheels combined with a drive therefor, without presenting any of the unsightly and costly disadvantages resulting from complicated exterior constructions heretofore used. Furthermore, in my improved construction I may provide a four-tractor drive with differentials for front and rear wheels and each of the wheels mounted in accordance with my invention, the construction and the flexibility of steering action permitted then being such that the vehicle may be turned through a circle of such a relatively limited radius that one of the rear wheels will practically act as a center.

By reason of the disposition of the stud axle 34 in the axle sleeve 31, I greatly strengthen the wheel knuckle and at the same time provide an axially disposed connection with the wheels so as to impart drive thereto without the provision of any gears exterior to the wheel hub.

It is believed that the advantages and utilities of my invention will be clear from the foregoing, and while I have herein shown and described one specific form of my invention, I do not wish to be limited thereto, except for such limitations as the claims may import.
I claim :—

1. In a motor vehicle driving mechanism, an axle having a knuckle fork on the end thereof, a stud sleeve disposed in said fork, a stud axle in said sleeve, a wheel mounted on said sleeve and connected with said stud axle, a drive shaft mounted in said axle, gears connected with said stud axle and drive shaft, a knuckle shaft received through the fork of the axle and the stud sleeve, gears mounted upon the knuckle shaft to transmit motion from the drive shaft to the stud axle, said knuckle shaft arranged in the fork and stud sleeve to form a bearing between the upper arm of the fork and blade, and a bushing received around said shaft and mounted within the lower arm of the fork and said stud sleeve to form a bearing therebetween.

2. In a motor vehicle driving mechanism, an axle having a knuckle fork on the end thereof, a stud sleeve disposed in said fork, a stud axle in said sleeve, a wheel mounted on the stud sleeve and connected with said axle, a drive shaft rotatably mounted in said axle, bevel gears connected with said stud axle and drive shaft, a knuckle shaft received through the fork of the axle and bearing provided on the stud sleeve, a bushing received around said knuckle shaft in a portion of the length thereof and spaced therefrom to take the bearing strain, a bevel gear received around the knuckle shaft and mounted within one end of said bushing, a second bevel gear mounted in a like manner in the opposite end of said bushing, a clutch connection between said bevel gears within the bushing and all of said parts so arranged that power motion is transmitted from the drive shaft to the stud axle.

In testimony whereof I affix my signature in presence of two witnesses.

JOHN P. SCHMIT.

Witnesses:
  HERBERT W. SADLER,
  RICHARD S. BAKER.